United States Patent [19]

Trost

[11] Patent Number: 4,789,988

[45] Date of Patent: Dec. 6, 1988

[54] SOLID-STATE LASER HAVING A MOVING LASING MATERIAL

[75] Inventor: David J. Trost, Seattle, Wash.

[73] Assignee: Spectra-Physics, Inc., San Jose, Calif.

[21] Appl. No.: 101,775

[22] Filed: Sep. 29, 1987

[51] Int. Cl.$^4$ .......................... H01S 3/045; H01S 3/17
[52] U.S. Cl. ........................................ 372/34; 372/66; 372/72; 372/92; 372/103
[58] Field of Search .................... 372/34, 35, 72, 66, 372/75, 103, 92, 69, 51, 52, 53, 67

[56] References Cited

U.S. PATENT DOCUMENTS 3,633,126  1/1972  Martin et al. ......................... 372/35
4,555,786  11/1985  Byer ..................................... 372/34

OTHER PUBLICATIONS

Basu et al; "A Moving-Slab Geometry Nd: Glass Laser"; Optical Society of America; vol. 11, No. 10/Oct. 1986; pp. 617–619.
Basu et al; "A Proposed IKW—Laser"; IEEE Journal of Quantum Electronics, vol. QE-22, No. 10; Oct. 1986; pp. 2052–2057.

Primary Examiner—William L. Sikes
Assistant Examiner—Xuan Vo
Attorney, Agent, or Firm—Seed and Berry

[57] ABSTRACT

A solid-state laser having a smoothly moving lasing material. A closely toleranced, fluid-bearing assembly extends around the slab of moving lasing material for both supporting and cooling the slab of material with a film of a thermally conductive fluid, such as helium. The lasing means, which causes a portion of the lasing material to heat, is immediately adjacent the fluid-bearing assembly, and the heated lasing material is moved into the fluid-bearing assembly for cooling as soon as possible after it has been heated by the lasing operation. The slab of lasing material can be in the form of a rectangular block or a ring with a rectangular cross section. In the first case, the slab of lasing material is moved through the fluid-bearing assembly in a back-and-forth motion by a transport mechanism. In the second case, the ring is cooled by driving it through the fluid-bearing assembly in a single direction.

25 Claims, 2 Drawing Sheets

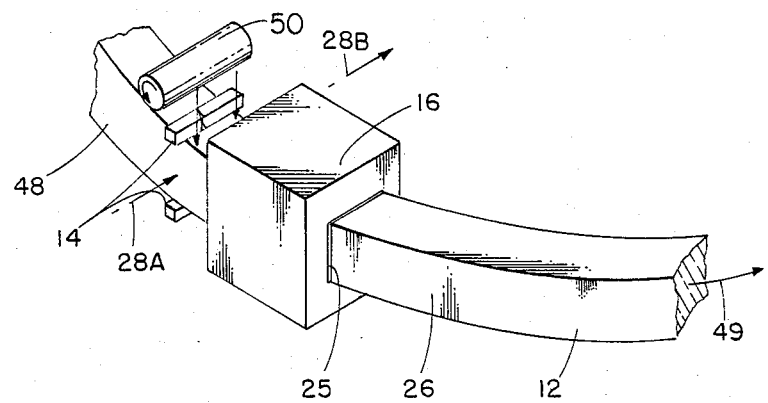

SOLID-STATE LASER HAVING A MOVING LASING MATERIAL

DESCRIPTION

1. Technical Field

The present invention relates to solid-state lasers, and more particularly, to solid-state lasers having a smoothly moving lasing material.

2. Background Art

Solid-state lasers typically use a flashlamp or diodes to pump a pulse of optical energy into a slab of solid-state material. This pulse of energy causes the electrons in the material to reach a more excited state and to generate a pulse of coherent light released when the electrons relax to a less excited state. The conversion to laser energy, however, is not perfectly efficient, and, accordingly, the slab of solid-state material is heated by the waste energy.

When the slab of solid-state material is heated up while initiating lasing action, it heats up nonuniformly, with the center of the block generally reaching the highest temperature. Because of the temperature nonuniformities, the index of refraction of material varies from point to point within the slab. This produces a nonuniform light beam and degrades the beam's coherence. It may also possibly damage the slab.

A variety of approaches to removing the heat from the slab of solid-state material have been tried. One approach is to flow a coolant fluid around the slab. Heat conduction from the center to edge of the slab limits the power available in the laser.

In an article published by Basu and Byers in *Optics Letters* 11(10): 617 (October 1986), designs for moving slab lasers were disclosed. Moving slab lasers work on the basic principle that the center temperature in a slab of solid-state material can be controlled by causing only a portion of the length of the slab to lase at a particular time. After the material is heated up due to the lasing action, it is moved away from the lasing means into a cooling means where it can be cooled.

In accordance with this basic principle, the moving slab laser used a slab of material having a rectangular cross section along one dimension. The slab was driven in a back-and-forth motion by a transport means along the dimension through a lasing means and a cooling means. In another embodiment, according to later developments, the material took the form of a ring having a rectangular cross section, and the transport means caused the ring to pass through the lasing means and the cooling means in one direction.

In previous designs, however, the lasing means physically interfered with the cooling means, which, accordingly, required high volumes of a cooling fluid to be circulated past the slab of solid-state material. In other designs, the cooling means have required thick (e.g., one millimeter) gas layers for clearance between the cooling means and the moving slab of solid-state material.

In addition to the problems outlined above, the designs of the prior art required a separate linear bearing. The bearing increased design complexity and limited the laser performance due to vibrations and mechanical resonances. Another problem with moving slab lasers of the prior art is the difficulty of moving the slab smoothly enough not to degrade the coherence of the laser. It is therefore desirable to provide a moving slab laser that has a smoothly moving slab of lasing material and an effective cooling means to solve the noted problems and disadvantages of the prior art.

DISCLOSURE OF THE INVENTION

It is an object of the present invention to provide a moving slab laser having a more effective cooling means in order to ensure that the slab of solid-state material operates at a more nearly constant temperature.

It is another object of the present invention to provide a moving slab laser having a block of solid-state material that moves substantially smoothly.

It is a further object of the present invention to provide a moving slab laser having reduced complexity, by combining the cooling and bearing means.

The present invention provides a solid-state laser having a smoothly moving lasing material, including a movable lasing material having a substantially fixed shape and a surface portion, lasing means for selectively causing a localized portion of the lasing material to lase, a fluid-bearing assembly with a surface positioned to be in juxtaposition with and immediately adjacent to the lasing material surface portion as the lasing material moves relative to the fluid-bearing assembly. The fluid-bearing assembly also includes fluid means for communication of a thermally conductive fluid to an interface between the fluid-bearing assembly surface portion and the lasing material surface portion to transfer heat and provide a fluid bearing therebetween. The solid-state laser further includes means for supplying the thermally conductive fluid to the fluid-bearing assembly, means for cooling the fluid-bearing assembly, and transport means for moving the laser material to pass the lasing material surface portion corresponding to the localized portion of the lasing material lased past the surface portion of the fluid-bearing assembly.

BRIEF DESCRIPTION OF THE DRAWINGS

FIG. 3 is an isometric, schematic view of a moving slab laser of the present invention using a ring-shaped slab of material.

BEST MODE FOR CARRYING OUT THE INVENTION

Figure 1:
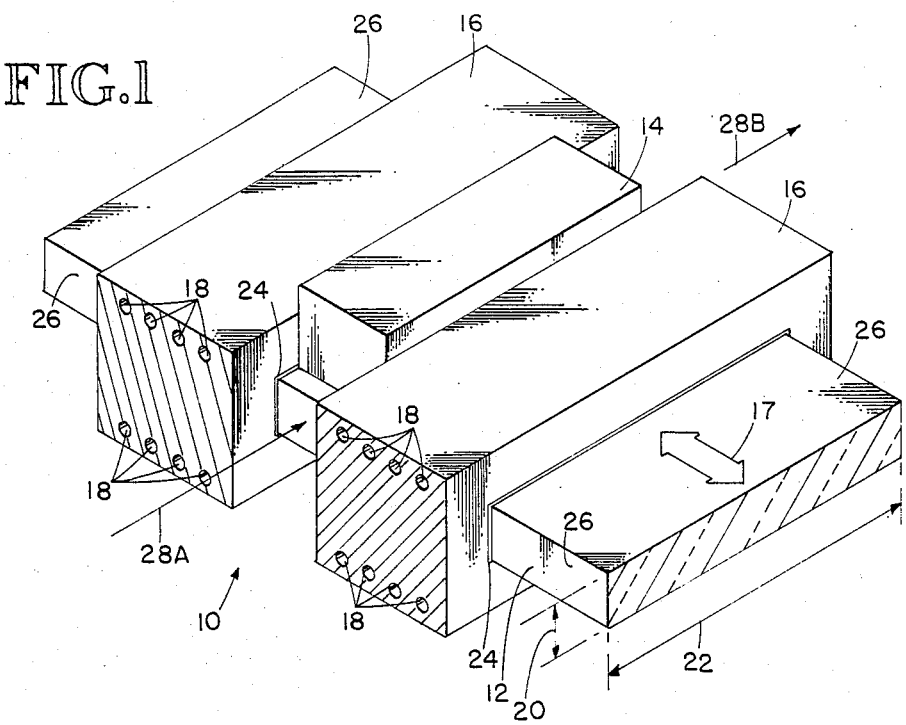
FIG. 1 is an isometric, schematic view of a moving slab laser of the present invention using a rectangular slab of lasing material.

Referring to FIG. 1, a moving slab laser 10 of the present invention comprises a rectangular slab of lasing material 12 (e.g., YAG or titanium sapphire) and a lasing means 14 (e.g., a flashlamp or diodes) for pumping energy into the slab of lasing material 12. In addition, the laser 10 includes two fluid-bearing assemblies 16, supply means (not shown) for supplying a thermally conductive fluid to each of the fluid-bearing assemblies 16, and a transport means (not shown) for moving the lasing material back and forth with respect to the lasing means 14 in the directions shown by double-headed arrow 17. In the embodiment of FIG. 1, the fluid-bearing assemblies 16 each also include a series of cooling channels 18, built into the fluid-bearing assembly and used as a means for cooling the fluid-bearing assembly. A fluid such as water or ethylene glycol is circulated through the cooling channels 18 in accordance with conventional cooling procedures. In other embodiments, the means for cooling the fluid-bearing assembly can comprise a series of coolant-carrying tubes surrounding and adjacent to the fluid bearing assembly 16.

The lasing material 12 has a constant thickness, indicated by arrow 20, and a constant width, indicatd by arrow 22, along the entire length of the lasing material 12. The lasing material 12 is dimensioned to pass through an opening 24 in each of the fluid-bearing assemblies 16, with each exterior facing surface 26 of the lasing material in close proximity to a corresponding interior wall surface 25 (shown in FIG. 2) of the fluid-bearing assembly. The gap between the lasing material surfaces 26 (only two shown in FIG. 1) and the corresponding interior wall surface 25 of the fluid-bearing assembly is small. The gap is a few microns wide for gas bearings or a few tens of microns wide for liquid bearings, reflecting their viscosity dependence. Despite the close tolerances, the slab of lasing material 12 moves freely back and forth in the directions 17 through the fluid-bearing assemblies 16.

In operation, the slab of lasing material 12 of the moving slab laser 10 receives energy from both the lasing means 14 and an input beam indicated by arrow 28A. which enters the lasing material 12 through one of the exterior facing side surfaces 26 at a position between the fluid-bearing assemblies 16, and thereby produces an amplified light beam, indicated by arrow 28B. At each instantaneous location of the lasing material 12 with respect to the lasing means 14, the lasing action caused by this injection of energy locally heats the lasing material 12 slightly. Concurrently with the lasing action, the lasing material 12 is caused to translate back and forth along the direction 17 so that any portion of the lasing material 12 that has recently been heated by the lasing action very soon thereafter enters one of the fluid-bearing assemblies 16. In other embodiments, where the lasing means 14 heats up a localized portion of the lasing material 12, it may be desirable to separate the fluid-bearing assemblies 16 farther from the lasing means 14 so that the heat from the localized area may dissipate to the exterior portion of the lasing material 12 before it is cooled. The fluid-bearing assembly 16, by virtue of its thermal conductive properties and the cooling channels 18, also acts to help maintain a more uniform and controlled temperature in the lasing material 12. Under the control of a transport means (not shown), the lasing material 12 is moved back and forth at speeds that are appropriate to prevent the lasing material 12 from overheating.

Figure 2:
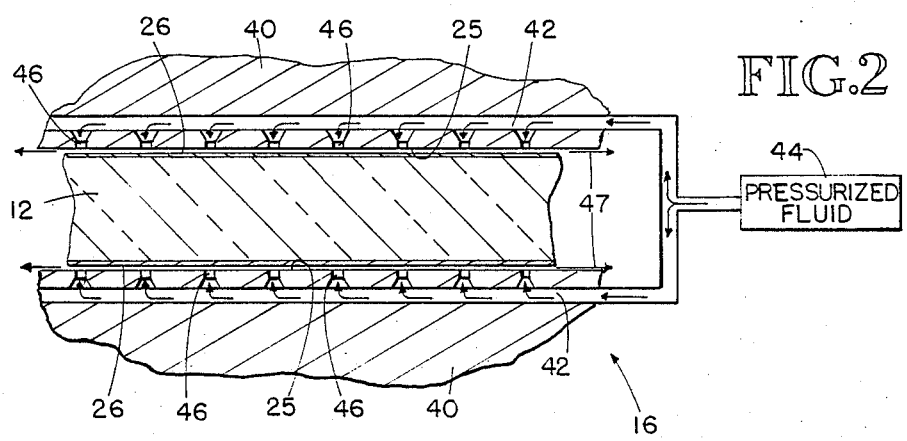
FIG. 2 is a cross-sectional elevational view of a fluid-bearing assembly of the form used with the moving slab laser of FIG. 1.

As best shown in FIG. 2, the fluid-bearing assembly 16 includes thick walls 40 manufactured of a material such as aluminum or copper which define therebetween the close fitting opening 24 through which the lasing material 12 passes. A series of fluid passages 42 are formed in the upper and lower walls of wall 40 and are connected in a conventional manner to a pressurized source 44 of a thermally conductive fluid (e.g., helium gas). The fluid passages 42 each connect in a conventional manner in order to be in fluid communication with a series of orifices 46 formed in one of the interior wall surfaces 25. The orifices 46 can be extremely small in size (typically an order of magnitude larger in diameter than the gap thickness). The orifices 46 generate a very fine, high-velocity layer 47 of the thermally conductive fluid supplied by the pressurized source 44 between the interior wall surfaces 25 of the fluid-bearing assembly 16 and the corresponding exterior surface 26 of the moving laser material 12. A structure of this form is conventionally known as a "fluid bearing" and can be made in either a hydrostatic form or a hydrodynamic form. A hydrostatic fluid bearing maintains a layer of a fluid between two structures intended to undergo relative motion, even when the two structures are not moving with respect to one another. A hydrodynamic bearing, on the other hand, develops its fluid layer only when the two structures undergo relative movement. It requires no orifices.

By establishing an extremely thin layer 47 of a thermally conductive fluid between the corresponding surfaces 25 and 26, virtually all of the heat created by the lasing action in the lasing material 12 is conducted to the walls 40 of the fluid-bearing assembly 16. The walls 40 can then be conventionally cooled, such as by the cooling channels 18 shown in FIG. 1. According to this structure, the fluid-bearing assembly 16 provides both a virtually vibration-free bearing for supporting the moving slab of lasing material 12 and a cooling mechanism for removing the heat generated by the lasing action in the lasing material.

Alternative forms of the present invention can also be realized. As shown in FIG. 3, the lasing material 12 can have the form of a ring 48 with a constant rectangular cross section. Lasing action can be initiated in the ring 48 by lasing means 14 (e.g., a flash tube constructed to surround the ring of the lasing material). The ring 48 passes through the fluid-bearing assembly 16, which, in this embodiment, has an annular shape and, as described above, concurrently serves as both a cooling means and a bearing means. Since the ring 48 is endless, it is sufficient to drive the ring through the fluid-bearing assembly 16 in a single direction, indicated by arrow 49. Accordingly, a transport mechanism 50 (e.g., a driven roller frictionally engaging the ring) need only operate in one rotational direction. By placing the fluid-bearing assembly 16 immediately adjacent the lasing means 14, that portion of lasing material 12 which has just been heated by the lasing means 14 passes immediately thereafter into the fluid-bearing assembly 16 to be cooled. The construction of the fluid-bearing assembly 16 is substantially as shown in FIG. 2, with the interior wall surfaces 25 of the fluid-bearing assembly walls 40 being curved to form cylindrical surfaces to closely receive the exterior surface 26 of the lasing material 12.

While various embodiments of the present invention have been explained in the foregoing discussion, one skilled in the art will find that it has rendered many modifications of the present invention rendered obvious. Accordingly, the spirit and scope of the present invention are to be limited only by the following claims.

I claim:

1. A solid-state laser having a smoothly moving lasing material, comprising:
   a movable lasing material with a substantially fixed shape and surface portion;
   lasing means for selectively causing a localized portion of the lasing material to lase;
   a fluid-bearing assembly with a surface portion positioned to be in juxtaposition with and immediately adjacent to the lasing material surface portion as the lasing material moves relative to the fluid-bearing assembly, the fluid-bearing assembly further having fluid means for comunication of a thermally conductive fluid to an interface between the fluid-bearing assembly surface portion and the lasing material surface portion to transfer heat and provide a fluid bearing therebetween;

means for supplying the thermally-conductive fluid to the fluid-bearing assembly fluid means;

means for cooling the fluid-bearing assembly; and transport means for moving the lasing material to pass the lasing material surface portion corresponding to the localized portion of the lasing material lased past the surface portion of the fluid-bearing assembly.

2. The solid-state laser of claim 1 wherein the lasing material is a block having a substantially constant rectangular cross section along its length.

3. The solid-state laser of claim 1 wherein the lasing material is a ring having a substantially rectangular cross section along its circumferential length.

4. The solid-state laser of claim 3 wherein the lasing material has a circumferential portion with an elongated shape and the transport moves the lased localized portion of the elongated lasing material portion in a longitudinal direction toward the fluid-bearing assembly.

5. The solid-state laser of claim 1 wherein the lasing material has an elongated portion and the transport means moves the lased localized portion of the elongated lasing material portion in a longitudinal direction from the lasing means toward the fluid-bearing assembly.

6. The solid-state laser of claim 1 wherein the fluid-bearing assembly is a hydrostatic fluid-bearing assembly.

7. The solid-state laser of claim 1 wherein the fluid-bearing assembly is a hydrodynamic fluid-bearing assembly.

8. The solid-state laser of claim 1 wherein the lasing means is positioned adjacent to the fluid-bearing assembly and the transport means moves the localized portion of the lasing material that is caused to lase to position the corresponding lasing material surface portion in juxtaposition with the fluid-bearing assembly surface portion immediately after the localized portion is moved away from the lasing means.

9. The solid-state laser of claim 1 wherein the transport means moves the lasing material in a back-and-forth motion to position the corresponding surface portion of the localized portion of the lasing material that is caused to lase into and out of juxtaposition with the fluid-bearing assembly surface portion.

10. The solid-state laser of claim 1 wherein the fluid-bearing assembly comprises a pair of spaced-apart fluid bearings positioned along a lengthwise portion of the lasing material therewithin, and wherein the lasing means is positioned between the fluid bearings.

11. The solid-state laser of claim 1 wherein the fluid-bearing assembly fluid means includes a plurality of orifices in the fluid-bearing assembly surface portion to inject the thermally conductive cooling between the fluid-bearing assembly surface portion and the lasing material surface portion to form a heat-conducting and lubricating fluid film therebetween.

12. A solid-state laser having a smoothly moving lasing material, comprising:

a movable lasing material with a substantially fixed shape and a pair of spaced-apart, generally oppositely facing exterior surface portions;

lasing means for selectively causing a localized portion of the lasing material between the pair of lasing material exterior surface portion to lase;

a fluid-bearing assembly receiving the movable lasing material therewithin, the fluid-bearing assembly having a pair of spaced-apart interior surface portions, each positioned to be in juxtaposition with and immediately adjacent to a corresponding one of the lasing material exterior surface portions as the lasing material moves within the fluid-bearing assembly, the fluid-bearing assembly further having fluid means for communication of a thermally conductive fluid to an interface between the fluid-bearing assembly interior surface portions and the corresponding ones of the lasing material exterior surface portions to transfer heat and provide a fluid bearing therebetween;

means for supplying the thermally conductive fluid to the fluid-bearing assembly fluid means;

means for cooling the fluid-bearing assembly; and transport means for moving the lasing material to pass the lasing material exterior surface portions corresponding to the localized portion of the lasing material lased past the interior surface portions of the fluid-bearing assembly.

13. The solid-state laser of claim 12 wherein the lasing material is a block having a substantially constant rectangular cross section along its length.

14. The solid-state laser of claim 12 wherein the lasing material is a ring having a substantially rectangular cross section along its circumferential length.

15. The solid-state laser of claim 14 wherein the lasing material has a circumferential portion with an elongated shape and the transport moves the lased localized portion of the elongated lasing material portion in a longitudinal direction toward the fluid-bearing assembly.

16. The solid-state laser of claim 12 wherein the lasing material has an elongated portion and the transport means moves the lased, selected, localized portion of the elongated lasing material portion in a longitudinal direction toward the fluid-bearing assembly.

17. The solid-state laser of claim 12 wherein the fluid-bearing assembly is a hydrostatic fluid-bearing assembly.

18. The solid-state laser of claim 12 wherein the fluid-bearing assembly is a hydrodynamic fluid-bearing assembly.

19. The solid-state laser of claim 12 wherein the lasing means is positioned adjacent to the fluid-bearing assembly and the transport means moves the localized portion of the lasing material that is caused to lase into the fluid-bearing assembly immediately after it is moved away from the lasing means.

20. The solid-state laser of claim 12 wherein the transport means moves the lasing material in a back-and-forth motion into and out of the fluid-bearing assembly.

21. The solid-state laser of claim 12 wherein the fluid-bearing assembly comprises a pair of spaced-apart fluid bearings, each receiving a lengthwise portion of the lasing material therewithin, and wherein the lasing means is positioned between the fluid bearings.

22. The solid-state laser of claim 12 wherein the fluid-bearing assembly fluid means includes a plurality of orifices in the fluid-bearing assembly interior surface portion to inject the thermally conductive cooling fluid between the interior surface portions and the corresponding lasing material exterior surface portions to form a heat-conducting and lubricating fluid film therebetween.

23. A solid-state laser having a smoothly moving lasing material, comprising:

a movable lasing material with a substantially fixed, solid rectangular shape with a surface portion;

lasing means for selecting a localized portion of the lasing material to lase;

a fluid-bearing assembly comprising two fluid bearings, each fluid bearing having a surface portion positioned to be in juxtaposition with and immediately adjacent to a distinct part of the surface portion of the lasing material, the surface portion of each fluid bearing containing a plurality of orifices for injecting a film of a thermally conductive cooling fluid between the surface portion and the corresponding part of the surface portion of the lasing material to transfer heat therebetween and to allow the lasing material to move smoothly with respect to the fluid bearing, each fluid bearing further having fluid means for communication of the thermally conductive cooling fluid to the plurality of orifices;

means for supplying the thermally conductive fluid to the fluid means of the fluid bearings of the fluid-bearing assembly;

means for cooling the fluid-bearing assembly; and transport means for moving the lasing material to pass the lasing material surface portion corresponding to the localized portion of the lasing material lased past the parts of the surface portion of the fluid bearings of the fluid-bearing assembly in a back-and-forth motion with respect to the lasing means.

24. The solid-state laser of claim 23 wherein the fluid bearings are hydrostatic fluid bearings.

25. The solid-state laser of claim 24 wherein the cooling fluid is helium gas.

* * * * *